United States Patent
Schwendimann et al.

(10) Patent No.: US 9,371,148 B1
(45) Date of Patent: Jun. 21, 2016

(54) METHODS AND ARTICLES FOR IMAGE TRANSFER

(75) Inventors: Jodi A. Schwendimann, Minnetonka Beach, MN (US); Nabil F. Nasser, Dayton, OH (US); Earl Pickering, Hopkins, MN (US)

(73) Assignee: NuCoat, Inc., Plymouth, MN (US)

( * ) Notice: Subject to any disclaimer, the term of this patent is extended or adjusted under 35 U.S.C. 154(b) by 1312 days.

(21) Appl. No.: 12/556,378

(22) Filed: Sep. 9, 2009

Related U.S. Application Data

(60) Provisional application No. 61/233,959, filed on Aug. 14, 2009.

(51) Int. Cl.
| | |
|---|---|
| *B65C 5/00* | (2006.01) |
| *B41M 5/50* | (2006.01) |
| *B65C 5/02* | (2006.01) |
| *B41M 5/52* | (2006.01) |

(52) U.S. Cl.
CPC .................. *B65C 5/00* (2013.01); *B41M 5/502* (2013.01); *B65C 5/02* (2013.01); *B41M 5/5218* (2013.01); *B41M 5/5263* (2013.01); *Y10T 428/24802* (2015.01)

(58) Field of Classification Search
None
See application file for complete search history.

(56) References Cited

U.S. PATENT DOCUMENTS

| | | | |
|---|---|---|---|
| 5,202,180 A | 4/1993 | Watts | |
| 6,071,611 A | 6/2000 | Ohta et al. | |
| 6,096,475 A | 8/2000 | Hare et al. | |
| 6,242,510 B1 * | 6/2001 | Killey | 523/204 |
| 6,444,305 B2 * | 9/2002 | Banovetz et al. | 428/321.5 |
| 6,506,445 B2 * | 1/2003 | Popat et al. | 427/146 |
| 6,551,702 B1 | 4/2003 | Biedermann et al. | |
| 6,780,924 B2 * | 8/2004 | Shih et al. | 524/555 |
| 7,309,731 B2 * | 12/2007 | Shih et al. | 524/513 |
| 2002/0029843 A1 | 3/2002 | Popat et al. | |
| 2002/0048663 A1 * | 4/2002 | Ueno et al. | 428/195 |
| 2003/0008116 A1 * | 1/2003 | Williams et al. | 428/195 |
| 2003/0217489 A1 * | 11/2003 | Witkowski | B44C 1/175 40/306 |
| 2004/0023800 A1 * | 2/2004 | Horii | B41M 5/502 503/227 |
| 2004/0260021 A1 * | 12/2004 | Macedo et al. | 525/63 |
| 2005/0000842 A1 * | 1/2005 | Timmerman | B26D 5/32 206/449 |
| 2005/0175818 A1 | 8/2005 | Kawabata et al. | |

(Continued)

OTHER PUBLICATIONS

E. L. Nichols. The Luminescence of Titanium Oxide. Received Dec. 1, 1922; published in the issue dated Nov. 1923. © 1923 The American Physical Society.*

(Continued)

*Primary Examiner* — Gerard Higgins
*Assistant Examiner* — Sathavaram I Reddy
(74) *Attorney, Agent, or Firm* — Winthrop & Weinstine, P.A.

(57) ABSTRACT

Image transfer articles, sheets and methods are disclosed. The image transfer articles and sheets can include or be configured to receive an image. The image can be capture on one or more ink or other marking receptive layers of the image transfer articles or sheets. In various examples, the image transfer articles provide decorative features in addition to the image. Such decorative features can include article portions bearing elements such as, but not limited to, metallic flakes, metallic-like flakes, glitter materials, sparkle materials, luminescent materials (e.g., having a glow-in-the-dark effect), pearlescent materials, reflective materials, or combinations thereof. In some examples, the image transfer articles include a vanishing layer configured to hold or sustain the image on a receptor element until the receptor element is washed a predetermined number of times.

19 Claims, 7 Drawing Sheets

(56) References Cited

U.S. PATENT DOCUMENTS

| 2007/0054117 | A1 | 3/2007 | Katchko et al. |
| 2007/0077384 | A1 | 4/2007 | Yang |
| 2007/0117927 | A1 | 5/2007 | Han et al. |
| 2007/0172644 | A1 | 7/2007 | Hama et al. |
| 2007/0254149 | A1 | 11/2007 | Eckert |
| 2009/0009577 | A1 | 1/2009 | Nigam |
| 2009/0017234 | A1 | 1/2009 | Song et al. |

OTHER PUBLICATIONS http://www.adhesives.org/adhesives-sealants/adhesives-sealants-overview/adhesive-technologies/physically-hardening/water-based-adhesives.*

"U.S. Appl. No. 12/556,329, Non Final Office Action mailed Nov. 23, 2012", 17 pgs.

"U.S. Appl. No. 12/556,329 , Response filed Feb. 11, 2013 to Non Final Office Action mailed Nov. 23, 2012", 15 pgs.

"U.S. Appl. No. 12/556,329, Final Office Action mailed May 24, 2013", 20 pgs.

"U.S. Appl. No. 12/556,329, Response filed Jul. 23, 2013 to Final Office Action mailed May 24, 2013", 13 pgs.

"", Made-in-China, China-Polyvinyl-Alcohol-P, [Online] retrieved from the internet: <http://hblanyin.en.made-in-china.com/product/UbBxricvbXRI/China-Polyvinyl-Alcohol-P>, (Jun. 13, 2014), 2 pgs.

"U.S. Appl. No. 12/556,329, Non Final Office Action mailed Jul. 18, 2014", 21 pgs.

"U.S. Appl. No. 12/556,329, Response filed Oct. 20, 2014 to Non Final Office Action mailed Jul. 18, 2014", 22 pgs.

\* cited by examiner

METHODS AND ARTICLES FOR IMAGE TRANSFER

CLAIM OF PRIORITY

This non-provisional patent application claims the benefit of priority under 35 U.S.C. §119(e) to U.S. Provisional Patent Application Ser. No. 61/233,959, entitled "METHODS AND APPARATUS FOR IMAGE TRANSFER," filed on Aug. 14, 2009, the specification of which is herein incorporated by reference in its entirety.

TECHNICAL FIELD

This patent document pertains generally to image transfer articles and methods. More particularly, but not by way of limitation, this patent document pertains to image transfer articles providing various decorative effects and associated transfer methods.

BACKGROUND

Expressing creativity can bring about feelings of great satisfaction and self-worth. Finding a desired mode of self-expression can often be more difficult than creating the expression itself. Image transfer technology has been, and continues to be, an ever-increasing mode of popular self-expression that allows one to find or create an image that satisfies a personal creative drive or at the least, to have a personalized image that is unique to the individual end user. This image, upon creation, can subsequently be transferred to a desired receptor element, which can be worn, carried, or displayed.

OVERVIEW

Although image transfer technologies have been in use for many years, these technologies remain difficult for the average end user to apply. Additionally, current image transfer technologies configured for at-home use do not provide images having internal decorative patterns. Further yet, these images can be limited to pre-created template options, which likely differ from a user-desired or user-created image. The inventors of the present patent document have recognized the limitations of the art as it currently stands, and have addressed these needs.

Image transfer articles, sheets and methods are disclosed. The image transfer articles and sheets can include or be configured to receive an image comprising one or more markings. The image can be capture on one or more ink or other marking receptive layers of the image transfer articles or sheets. By way of example, but not of limitation, the ink or other marking receptive layers can be configured to receive one or more markings from a printer, a copier, a marker, a pencil, a crayon, a dye sublimation process, a thermal pigment transfer process, or other toner, ink, or pigment-based imaging methods or apparatus. In various examples, the image transfer articles provide decorative features in addition to the image. Such decorative features can include article portions bearing elements such as, but not limited to, metallic flakes, metallic-like flakes, glitter materials, sparkle materials, luminescent materials (e.g., having a glow-in-the-dark effect), pearlescent materials, reflective materials, or combinations thereof, any of which can be revealed during the creation process by the end user.

To better illustrate the image transfer articles, sheets and methods disclosed in this patent document, a non-limiting list of examples is provided here:

In Example 1, an image transfer article comprises a resin or adhesive layer; a marking receptive layer; and a decorative layer, including surface-coated mica, positioned between the resin or adhesive layer and the marking receptive layer.

In Example 2, the image transfer article of Example 1 is optionally configured such that the decorative layer includes polyurethane.

In Example 3, the image transfer article of at least one of Examples 1 or 2 optionally further comprises a silicone liner proximate the resin or adhesive layer, opposite the decorative layer.

In Example 4, the image transfer article of at least one of Examples 1-3 is optionally configured such that the resin or adhesive layer includes an ethylene acrylic acid dispersion.

In Example 5, the image transfer article of at least one of Examples 1-4 is optionally configured such that the decorative layer comprises a metallic layer including carbon black.

In Example 6, the image transfer article of at least one of Examples 1-5 is optionally configured such that the decorative layer comprises a metallic layer including a plurality of metalized polyester particles.

In Example 7, the image transfer article of at least one of Examples 1-6 is optionally configured such that the marking receptive layer comprises a plurality of metalized polyester particles.

In Example 8, the image transfer article of at least one of Examples 1-7 is optionally configured such that the decorative layer comprises a metallic layer including a luminescent pigment.

In Example 9, the image transfer article of at least one of Examples 1-8 is optionally configured such that the marking receptive layer comprises a luminescent pigment.

In Example 10, an image transfer sheet includes a plurality of image transfer articles as recited in at least one of Examples 1-9, and is optionally configured such that each image transfer article is at least partially defined by a die cut extending around a perimeter thereof, with each die cut extending at least through the marking receptive layer and the decorative layer.

In Example 11, an image transfer sheet comprises a releasable liner or substrate; and one or more image transfer articles disposed on the releasable liner or substrate, each image transfer article including, a pre-formed image, and a resin or adhesive layer disposed between the releasable liner or substrate and the pre-formed image, wherein each image transfer article has a perimeter defined by at least one die cut extending through the resin or adhesive layer to the releasable liner or substrate, the at least one die cut allowing each image transfer article to separate from the releasable liner or substrate.

In Example 12, the image transfer sheet of Example 11 is optionally configured such that the resin or adhesive layer comprises a luminescent pigment.

In Example 13, the image transfer sheet of at least one of Examples 11 or 12 is optionally configured such that the resin or adhesive layer comprises a plurality of metalized polyester particles.

In Example 14, the image transfer sheet of at least one of Examples 11-13 is optionally configured such that the resin or adhesive layer separates from the releasable liner or substrate and attaches directly to a receptor element to transfer the pre-formed image.

In Example 15, the image transfer sheet of at least one of Examples 11-14 optionally further comprises a decorative layer disposed between the pre-formed image and the resin or adhesive layer, and wherein the die cut penetrates the decorative layer.

In Example 16, the image transfer sheet of Example 15 is optionally configured such that the decorative layer comprises mica.

In Example 17, the image transfer sheet of Example 16 is optionally configured such that the mica is coated with titanium oxide.

In Example 18, the image transfer sheet of Example 16 is optionally configured such that the decorative layer includes carbon black.

In Example 19, the image transfer sheet of at least one of Examples 15-18 is optionally configured such that the decorative layer comprises a plurality of metalized polyester particles.

In Example 20, the image transfer sheet of at least one of Examples 11-19 optionally comprises a marking receptive layer configured to receive the pre-formed image and disposed on above the resin or adhesive layer, and wherein the die cut penetrates the marking receptive layer.

In Example 21, the image transfer sheet of Example 20 is optionally configured such that the marking receptive layer comprises a plurality of metalized polyester particles.

In Example 22, the image transfer sheet of at least one of Example 20 or 21 is optionally configured such that the marking receptive layer comprises a luminescent pigment.

In Example 23, a method comprises coating a base layer with a resin or adhesive layer; coating a marking receptive layer above the resin or adhesive layer, such that the resin or adhesive layer is disposed between the base layer and the marking receptive layer; and die cutting through the marking receptive layer and the resin or adhesive layer.

In Example 24, the method of Example 23 is optionally configured such that coating the base layer with a resin or adhesive layer includes coating the base layer with a resin or adhesive layer comprising a plurality of coated aluminum metalized polyethylene terephthalate particles.

In Example 25, the method of at least one of Examples 23 or 24 optionally further comprises coating a decorative layer on the resin or adhesive layer, the decorative layer disposed between the resin or adhesive layer and the marking receptive layer.

In Example 26, the method of Example 25 is optionally configured such that coating a decorative layer includes coating a decorative layer comprising mica.

In Example 27, the method of at least one of Examples 25 or 26 is optionally configured such that coating a decorative layer includes coating a decorative layer comprising titanium oxide coated mica.

In Example 28, the method of at least one of Examples 25-27 is optionally configured such that coating a decorative layer includes coating a decorative layer comprising a plurality of coated aluminum metalized polyethylene terephthalate particles.

In Example 29, the method of at least one of Examples 25-28 is optionally configured such that coating a decorative layer includes coating a decorative layer comprising a luminescent pigment.

In Example 30, the method of at least one of Examples 25-29 is optionally configured such that coating a decorative layer includes coating a decorative layer comprising carbon black.

In Example 31, an image transfer sheet comprises a base layer; a resin or adhesive layer disposed on the base layer; a marking receptive layer disposed above the resin or adhesive layer; and one or more image transfer articles, each article having a perimeter and including a portion of the image transfer sheet, the perimeter of each image transfer article defined by a set of perforations extending through the base layer, the resin or adhesive layer and the printable marking receptive layer, wherein each image transfer article is configured to be separable from the remaining portions of the image transfer sheet at the set of perforations.

In Example 32, the image transfer sheet of Example 31 optionally comprises a release layer disposed between the resin or adhesive layer and the base layer.

In Example 33, the image transfer sheet of at least one of Examples 31 or 32 is optionally configured such that the set of perforations define a rectangular shape. In Example 34, the image transfer sheet of at least one of Examples 31-33 is optionally configured such that the set of perforations define a circular shape.

In Example 35, the image transfer sheet of at least one of Examples 31-34 is optionally configured such that the one or more image transfer articles include at least a first image transfer article defined by a first set of perforations and a second image transfer article defined by a second set of perforations.

In Example 36, the image transfer sheet of Example 35 is optionally configured such that the first image transfer article has a first shape defined by the first set of perforations and the second image transfer article has a second shape defined by the second set of perforations.

In Example 37, the image transfer sheet of Example 36 is optionally configured such that the first shape and the second shape are substantially similar.

In Example 38, the image transfer sheet of at least one of Examples 31-37 is optionally configured such that the resin or adhesive layer includes a copolymer dispersion.

In Example 39, the image transfer sheet of at least one of Examples 31-38 is optionally configured such that the resin or adhesive layer includes an ethylene acrylic acid copolymer.

In Example 40, the image transfer sheet of at least one of Examples 31-39 is optionally configured such that the marking receptive layer includes a polyamide material.

In Example 41, the image transfer sheet of at least one of Examples 31-40 is optionally configured such that the resin or adhesive layer includes a plurality of coated aluminum metalized polyethylene terephthalate particles.

In Example 42, the image transfer sheet of Example 41 is optionally configured such that the resin or adhesive layer includes carbon black.

In Example 43, the image transfer sheet of at least one of Examples 41 or 42 is optionally configured such that the resin or adhesive layer includes a luminescent material.

In Example 44, the image transfer sheet of at least one of Examples 31-43 is optionally configured such that the resin or adhesive layer comprises a polyamide copolymer; ethylene acrylic acid; and a wax emulsion.

In Example 45, an image transfer sheet comprises one or more perforated, separable image transfer articles, wherein each image transfer article includes, a silicone liner; a resin or adhesive layer disposed on the silicone; and a marking receptive layer disposed above the resin or adhesive layer.

In Example 46, the image transfer sheet of Example 45 optionally comprises a plurality of coated aluminum metalized polyethylene terephthalate particles disposed in the marking receptive layer.

In Example 47, a method comprises coating a base layer with a resin or adhesive layer; coating a marking receptive layer above the resin or adhesive layer, wherein the marking receptive layer is disposed on the resin or adhesive layer; and perforating the base layer, the resin or adhesive layer, and the marking receptive layer.

In Example 48, the method of Example 47 optionally comprises coating the base layer with a release agent disposed between the base layer and the resin or adhesive layer.

In Example 49, the method of at least one of Example 47 or 48 is optionally configured such that the base layer with a resin or adhesive layer includes coating the base layer with a resin or adhesive layer comprising a plurality of coated aluminum metalized polyethylene terephthalate particles.

In Example 50, the method of at least one of Examples 47-49 is optionally configured such that coating the base layer with a marking receptive layer includes coating the base layer with a marking receptive layer including, a polyamide copolymer; ethylene acrylic acid; a wax emulsion; silica; and a polymethyl siloxane modified wax emulsion.

In Example 51, an image transfer sheet comprises a base layer; and a marking receptive layer including, marble; poly (ethylene oxide); polyethylene wax; and a hot melt, wherein the marking receptive layer is configured to transfer an image to a receptor element and further configured to dissipate the image upon washing the receptor element a predetermined number of times.

In Example 52, the image transfer sheet is optionally configured such that the marking receptive layer is configured to dissipate the image upon a single washing.

In Example 53, the image transfer article, sheet, method or kit of any one or any combination of Examples 1-52 is optionally configured such that all elements or options recited are available to use or select from.

These and other examples, advantages, and features of the present image transfer articles, sheets and methods will be set forth in part in following Detailed Description. This Overview is intended to provide non-limiting examples of the present subject matter—it is not intended to provide an exclusive or exhaustive explanation. The Detailed Description is included to provide further information about the image transfer articles, sheets and methods disclosed in the present patent document.

BRIEF DESCRIPTION OF THE DRAWINGS

In the drawings, like numerals have been used to describe similar components throughout the several views. Like numerals having different letter suffixes have been used to represent different instances of similar components. The drawings illustrate generally, by way of example, but not by way of limitation, various embodiments discussed in the present patent document.

DETAILED DESCRIPTION

Figure 1:
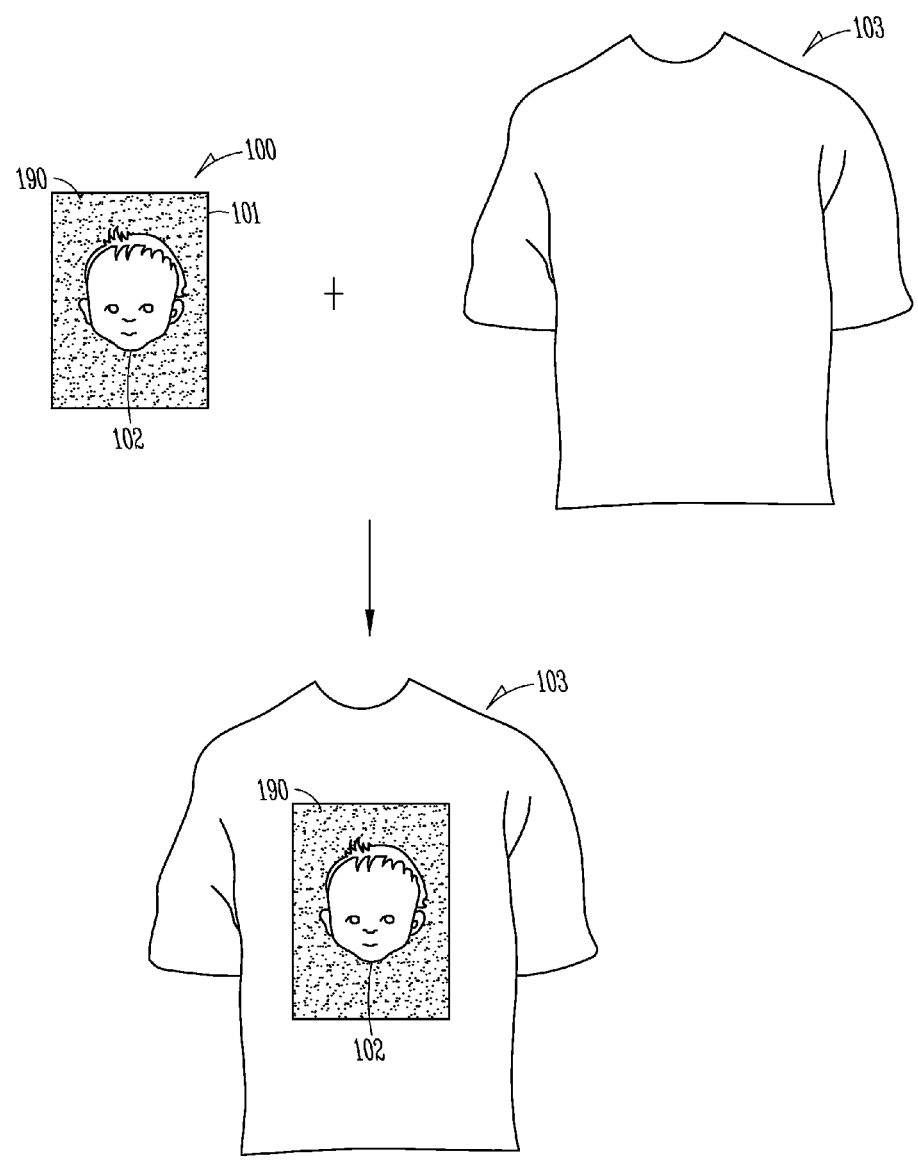
FIG. 1 pictorially illustrates a method of transferring an image transfer article, including an image, to a receptor element, according to at least one embodiment.

FIG. 1 illustrates an example image transfer article 100 including a received image 102. The image 102 can be captured on one or more ink or other marking receptive layers 101 of the image transfer article 100, either before or after purchase of the article from a retailer. Subsequently, the image transfer article 100 can be applied to a receptor element 103, such as a t-shirt, gym bag, apron, pillowcase, jersey or other display means, and the image 102 can be attached and adhered thereto. Other options for the receptor element include, for example, any textile, leather, ceramic, wool, glass, plastic, metal or canvas material.

The present image transfer article 100 provides outwardly-viewable decorative features 190 in addition to the image 102. Such decorative features 190 can include article portions bearing elements such as, but not limited to, metallic flakes, metallic-like flakes, glitter materials, sparkle materials, luminescent materials (e.g., having a glow-in-the-dark effect), pearlescent materials, reflective materials, or combinations thereof.

Figure 2:
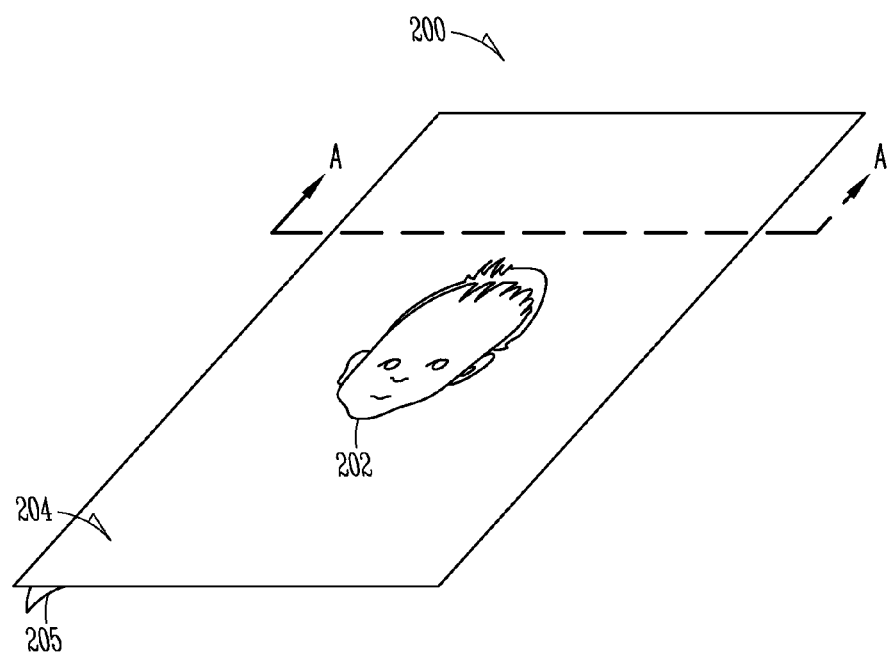
FIG. 2 illustrates an image transfer article, including an image, according to at least one embodiment.

FIG. 2 illustrates an isometric view of an example image transfer article 200, including a received image 202. The image transfer article 200 further includes one or more layers 204 possessing functional properties, decorative properties, or both functional and decorative properties. In the example shown, the image transfer article 200 includes a releasable liner or substrate 205 as one of the layers 204. In various examples, the releasable liner or substrate 205 supports other image transfer article layers during fabrication, imaging (i.e., a marking process), or image transfer. For instance, during image transfer, the releasable liner or substrate 205 can provide a heat barrier when the image 202 is being adhered to a receptor element. As another example, during fabrication, coating techniques such as dipping, painting, spraying, gravure, off-set, reverse roll, extrusion or melt extrusion, or coating apparatus such as Meyer rods, slot dies, rollers, knifes or other blades, curtains or slides, can be used to apply image transfer article layers 204 to the releasable liner or substrate 205.

Due to the structural configurations of the present image transfer articles 200, a hand iron may be used to apply the image 202 to a receptor element within the confines of one's own home. As a result, a consumer is not locked into the narrow choice of apparel at commercial copy service locations. Instead, the consumer can simply copy, print or otherwise reproduce a desired image onto a present transfer article 200, select from a wide variety of fabric garments readily available in retail stores or within the home, and effectuate an image transfer.

Figure 3:
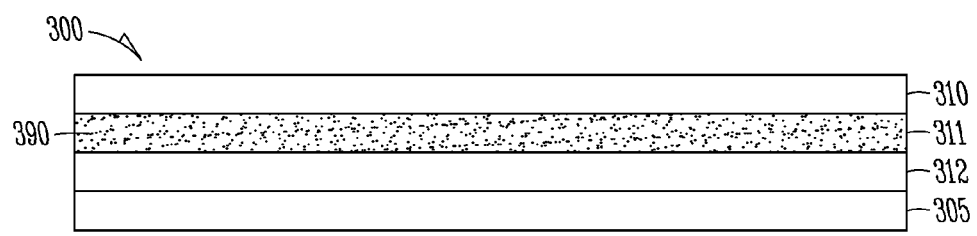
FIG. 3 illustrates a cross-sectional view of an image transfer article taken along a line similar to line A-A of FIG. 2, according to at least one embodiment.

FIG. 3 illustrates a cross-sectional view of an image transfer article 300 taken along a line similar to line A-A of FIG. 2, according to at least one example of the present subject matter. The image transfer article 300 can include one or more of an ink or other marking receptive layer 310, a decorative layer 311, and a resin or adhesive layer 312. In some examples, the ink or other marking receptive layer 310 is configured to receive ink or toner from a printer or copier source. In other examples, the marking receptive layer 310 is configured to receive one or more markings generated by a marker, a pencil, a crayon, a dye sublimation process, a thermal pigment transfer process, or other toner, ink, or pigment-based imaging methods or apparatus. In various examples, the image transfer article 300 can include a releasable liner or substrate 305. The releasable liner or substrate 305, if present, can provide a base layer. Coatings applied to the base layer can form the decorative 311 and functional layers (e.g., the resin or adhesive layer 312 and/or the marking receptive layer 310) of the image transfer article 300.

The process of applying an image to a receptor element depends, at least in part, on the structure of the image transfer article 300 bearing the image. In various examples, as noted above, the image transfer article 300 can include decorative features 390, which, depending on their concentration, may form an opaque, semi-opaque, or other non-transparent layer. Using the chemical formulations disclosed herein, decorative image transfer articles having good clarity, sharpness and color are possible. In such examples, the image can be located above the non-transparent layer including the decorative features 390 and removal of the releasable liner or substrate 305 can expose a layer 312 including a resin or adhesive. The resin or adhesive layer 312 can be applied directly to a receptor element, such as a t-shirt, gym bag, apron, pillowcase, jersey, or other textile, leather ceramic, wool, glass, plastic, metal or canvas display means, when being transferred thereto and before the heating and/or pressure portion of the image transferring process. After applying the adhesive layer to the receptor element, the previously-removed releasable liner or substrate 305 or another releasable overlay article can be used to cover a top exposed surface of the image transfer article 300 and provide a heat barrier during the transfer process. After the heat and/or pressure are applied, the liner or substrate 305 or other removable overlay article can be peeled away from the image at various hot or cold temperatures and discarded. In some examples, the exposed surface of the image transfer article 300 is an ink or other marking receptive layer 310 bearing a received image. This configuration is sometimes referred to as a "peel first" image transfer article or structure.

In some examples, the releasable liner or substrate 305 is configured to remain as part of the image transfer article until post-transfer (to a receptor element), and provides a heat barrier during the heating and/or pressure application portions of the image transferring process. In one such example, the ink or other marking layer 310 bears a mirrored image, which can be applied directly to the receptor element, such as a t-shirt or other textile article, when being transferred thereto and before the heating and/or pressure portions of the image transferring process. After applying the ink or other marking layer 310 against the receptor element, heat and/or pressure are applied, and subsequently the releasable liner or substrate 305 can be removed (e.g., peeled) from the other layers of the image transfer article 300. This configuration is sometimes referred to as a "peel after" image transfer article or structure, a "regular" image transfer article or structure, or a "reverse image" or "mirror" transfer article or structure.

In various examples, the resin or adhesive layer 312 can include an adhesive compound to attach the image to the receptor element. Compounds used for the resin or adhesive layer 312 can include, but are not limited to, an ethylene copolymer such as ethylene acrylic acid (EAA), ethylene methacrylic acid (EMAA), or ethylene-vinyl acetate (EVA). In some examples, the EAA or EMAA includes a melt index from about 5 to about 2500, such as from about 10 to about 1300. In some examples, the EAA or EMAA includes an acrylic acid concentration from about 0% to about 30%, such as from about 1% to about 20% for emulsion purposes. In some examples, the EAA, EMAA or EVA includes a melt point temperature between about 43° C. to about 160° C. In some examples, the resin or adhesive layer 312 comprises EVA with a vinyl acetate content of about 3% to about 45%. In some examples, an EVA resin or adhesive layer also includes a wax emulsion to provide better adhesion and flexibility to the image transfer article 300. In some examples, an EVA resin or adhesive layer 312 includes a carboxylic element to provide increased adhesion and toughness to the image transfer article 300.

Figure 4:
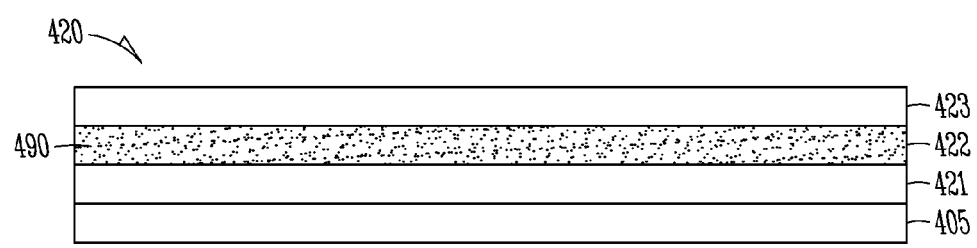
FIG. 4 illustrates a cross-sectional view of another image transfer article taken along a line similar to line A-A of FIG. 2, according to at least one embodiment.

FIG. 4 is a cross-sectional view of an image transfer article 420 taken along a line similar to line A-A of FIG. 2 and including a portion exhibiting pearlescent effects 490, according to at least one example of the present subject matter. The cross-section shows that the image transfer article 420 can include one or more of a releasable liner or substrate 405, a resin or adhesive layer 421, a decorative layer 422, and optionally an ink or other marking receptive layer 423. If no distinct ink or other marking receptive layer 423 is present, a resin or adhesive layer 421 including EAA with or without a cross-linker (e.g., XAMA®7 (polyfunctional aziridine)) can receive markings, such as laser jet markings, for example.

The resin or adhesive layer 421 can operate to attach an image received by the image transfer article to a receptor element. As discussed above, the resin or adhesive layer 421 can be coated onto a top surface of the releasable liner or substrate 405 and can include an ethylene copolymer, such as, but not limited to, ethylene acrylic acid (EAA), ethylene methacrylic acid (EMAA), or ethylene-vinyl acetate (EVA).

The decorative layer 422 can include pearlescent materials 490, such that when the image transfer article 420 is applied to a receptor element, the transferred image includes a pearlescent background. In some examples, the pearlescent decorative layer 422 can be coated onto the resin or adhesive layer 421. In some examples, the pearlescent decorative layer 422 includes a urethane polymer and a pearlescent pigment, such as coated mica particles. In some examples, the pearlescent decorative layer 422 includes an ethoxylated non-ionic fluorosufactant in addition to the urethane polymer and pearlescent pigment. Optionally, the pearlescent decorative layer 422 can include iridescent-effect inorganic particles detectable via light or temperature. In some examples, the pearlescent pigment can be coated with the resin or adhesive layer 421 or the ink or other marking receptive layer 423, such that one or more defined layers are formed simultaneously or substantially simultaneously.

In some examples, the ink or other marking receptive layer 423 can be coated onto the decorative layer 422. The ink or other marking receptive layer 423 can comprise pores for receiving ink jet or laser jet ink, for example. One or both of the ink or other marking receptive layer 423 or the decorative layer 422 can also include at least one binding composition in an amount sufficient to chemically bind the ink within the layer. In various examples, the at least one binding composition includes a glass transition temperature ($T_g$) between about −40° C. up to about 30° C., which the present inventors have found can reduce or inhibit flaking and cracking of a transferred image. The ink or other marking receptive layer 423 can optionally further include one or more of isopropyl alcohol, an ultrafine copolyamide, SMA (Styrene Maleic Anhydride resin), colloidal alumina, colloidal silica, polyester, a polyamide copolymer, polyurethane (optionally including surfactants such as Triton X-100, Triton 405, CT110, or Surfynol), acrylics with a glass transition temperature ($T_g$) between about −40° C. up to about 70° C., vinyl acetate, polyethylene oxide (with or without plasticizers, such as up to about 30% plasticizer), a cationic polymer, an ionic or non-ionic die-fixing agent, a polymeric ammonium compound or surfactants including an oxtylphenol ethoxylate non-ionic surfactant and an ethoxylated non-ionic fluorosurfactant, silica particles, cationic silica, clay, cationic-modified silica (e.g., JETCOAT®30) or other cationic polymer. Additional components such as inorganic fillers, anti-curl agents, surfactants, plasticizers, humectants, UV absorbers, optical brighteners, light fastness enhancers, polymeric dispersants, dye mordants or leveling agents, may also be present in the ink or other marking receptive layer 423.

Figure 5:
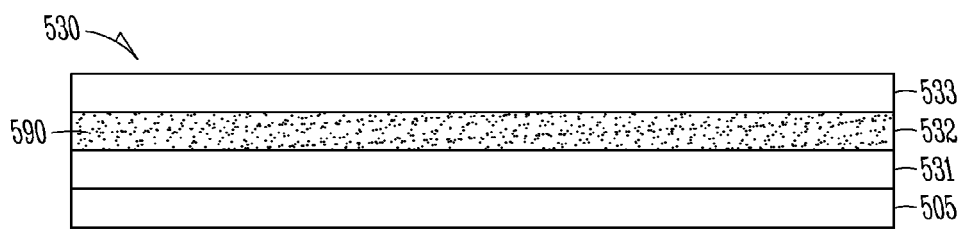
FIG. 5 illustrates a cross-sectional view of another image transfer article taken along a line similar to line A-A of FIG. 2, according to at least one embodiment.

FIG. 5 is a cross-sectional view of an image transfer article 530 taken along a line similar to line A-A of FIG. 2 and including a metallic effect 590, according to at least one example of the present subject matter. The cross-section shows that the image transfer article 530 can include one or more of a releasable liner or substrate 505, a resin or adhesive layer 531, a decorative layer 532, and optionally an ink or other marking receptive layer 533. If no distinct ink or other marking receptive layer 533 is present, a resin or adhesive layer 531 including EAA with or without a cross-linker (e.g., XAMA®7 (polyfunctional aziridine)) can receive markings, such as laser jet markings, for example.

The resin or adhesive layer 531, if present, can include materials to adhere a received image to a receptor element. In some examples, the receptor element includes a building wall, such as when the image transfer article 530 is used as a wallpaper. As discussed above, the resin or adhesive layer 531 can be coated into a top surface of the releasable liner or substrate 405 and can include an ethylene copolymer, such as, but not limited to, ethylene acrylic acid (EAA), ethylene methacrylic acid (EMAA), or ethylene-vinyl acetate (EVA).

The decorative layer 532 can include metallic or metallic-type materials 590 (e.g., titanium oxide and/or dioxide coated mica or tin oxide coated mica) such that when the image transfer article 530 is applied to a receptor element, the transferred image includes a metallic effect, either in the background of the image or integrated with or about a received image. In some examples, the metallic decorative layer 532 can be coated onto the resin or adhesive layer 531. In some examples, the metallic decorative layer 532 can include a urethane polymer, a pearlescent pigment or carbon black. In some examples, the metallic decorative layer 532 can include an ethoxylated non-ionic fluorosufactant in addition to the urethane polymer, pearlescent pigment or carbon black. Advantageously, the metallic decorative layer 532 can be formed without requiring a chemical reaction to take place. As a result, non-complex manufacturing and non-expensive manufacturing techniques can be used to create the metallic decorative layer 532.

In some examples, the ink or other marking receptive layer 533 can be coated onto the decorative layer 532. The ink or other marking receptive layer 533 can comprise pores for receiving ink jet or laser jet ink, for example. One or both of the ink or other marking receptive layer 533 or the decorative layer 532 can also include at least one binding composition in an amount sufficient to chemically bind the ink within the layer. In various examples, the at least one binding composition includes a glass transition temperature ($T_g$) between about −40° C. up to about 30° C., which the present inventors have found can reduce or inhibit flaking and cracking of a transferred image. The ink or other marking receptive layer 533 can optionally further include isopropyl alcohol, an ultrafine copolyamide, SMA (Styrene Maleic Anhydride resin), colloidal alumina, colloidal silica, polyester, a polyamide copolymer, polyurethane (optionally including surfactants such as Triton X-100, Triton 405, CT110, or Surfynol), acrylics with a glass transition temperature ($T_g$) between about −40° C. up to about 70° C., vinyl acetate, polyethylene oxide (with or without plasticizers, such as up to about 30% plasticizer), a cationic polymer, an ionic or non-ionic die-fixing agent, a polymeric ammonium compound or surfactants including an oxtylphenol ethoxylate non-ionic surfactant and an ethoxylated non-ionic fluorosurfactant, silica particles, cationic silica, clay, cationic-modified silica (e.g., JETCOAT®30) or other cationic polymer.

Figure 6:
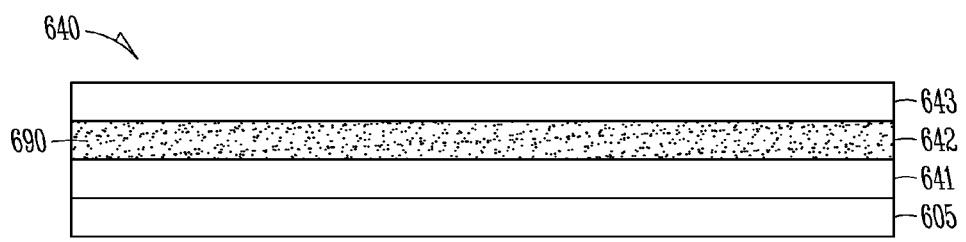
FIG. 6 illustrates a cross-sectional view of another image transfer article taken along a line similar to line A-A of FIG. 2, according to at least one embodiment.

FIG. 6 is a cross-sectional view of an image transfer article 640 taken along a line similar to line A-A of FIG. 2 and including a sparkle effect 690, according to at least one example of the present subject matter. The cross-section shows that the image transfer article 640 can include one or more of a releasable liner or substrate 605, a resin or adhesive layer 641, a decorative layer 642, and optionally an ink or other marking receptive layer 643. If no distinct ink or other marking receptive layer 643 is present, a resin or adhesive layer 641 including EAA with or without a cross-linker (e.g., XAMA®7 (polyfunctional aziridine)) can receive markings, such as laser jet markings, for example.

The resin or adhesive layer 641, if present, can operate to attach an image received by the image transfer article to a receptor element. As discussed above, the resin or adhesive layer 641 can be coated onto a top surface of the releasable liner or substrate 605 and can include an ethylene copolymer, such as, but not limited to, ethylene acrylic acid (EAA), ethylene methacrylic acid (EMAA), or ethylene-vinyl acetate (EVA).

The decorative layer 642 can include metallic particles or metallic-like particles 690 such that when the image transfer article 640 is applied to a receptor element, the transferred image includes sparkles integrated with or about a received image. In some examples, the decorative layer 642 can be coated onto a top surface of the resin or adhesive layer 641. In some examples, the decorative layer 642 can include a urethane polymer and the sparkle material. In some examples, the sparkle material includes metallic or metallic-like particles with particle sizes of about 0.004 inches or less. In some examples, the sparkle material includes coated aluminum metalized polyethylene terephthalate particles. In some examples, the decorative sparkle layer 642 includes an ethoxylated non-ionic fluorosufactant in addition to the urethane polymer and sparkle material.

The ink or other marking receptive layer 643 can be coated onto the decorative layer 642. The ink or other marking receptive layer 643 can comprise pores for receiving ink jet or laser jet ink, for example. One or both of the ink or other marking receptive layer 643 or the decorative layer 642 can also include at least one binding composition in an amount sufficient to chemically bind the ink within the layer. In various examples, the at least one binding composition includes a glass transition temperature ($T_g$) between about −40° C. up to about 30° C., which the present inventors have found can reduce or inhibit flaking and cracking of a transferred image. In some examples, the ink or other marking receptive layer 643 can optionally further include isopropyl alcohol, an ultrafine copolyamide, SMA (Styrene Maleic Anhydride resin), colloidal alumina, colloidal silica, polyester, a polyamide copolymer, polyurethane (optionally including surfactants such as Triton X-100, Triton 405, CT110, or Surfynol), acrylics with a glass transition temperature ($T_g$) between about −40° C. up to about 70° C., vinyl acetate, polyethylene oxide (with or without plasticizers, such as up to about 30% plasticizer), a cationic polymer, an ionic or non-ionic die-fixing agent, a polymeric ammonium compound or surfactants including an oxtylphenol ethoxylate non-ionic surfactant and an ethoxylated non-ionic fluorosurfactant, silica particles, cationic silica, clay, cationic-modified silica (e.g., JETCOAT®30) or other cationic polymer.

Figure 7:
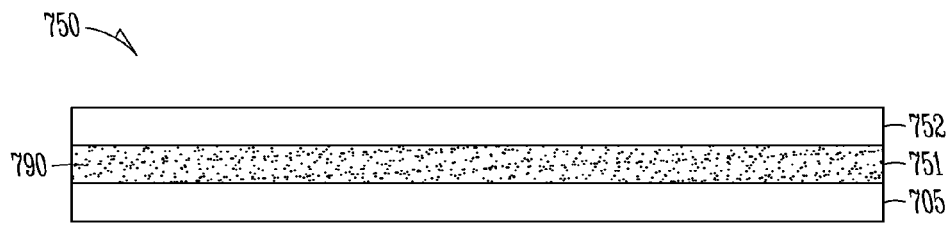
FIG. 7 illustrates a cross-sectional view of another image transfer article taken along a line similar to line A-A of FIG. 2, according to at least one embodiment.

FIG. 7 is a cross-sectional view of an image transfer article 750 taken along a line similar to line A-A of FIG. 2, according to at least one example of the present subject matter. The cross-section shows the image transfer article 750 can include one or more of a releasable liner or substrate 705, a decorative resin or adhesive layer 751, and optionally an ink or other marking receptive layer 752. If no distinct ink or other marking receptive layer 752 is present, a decorative resin or adhesive layer 751 including EAA with or without a cross-linker (e.g., XAMA®7 (polyfunctional aziridine)) can receive markings, such as laser jet markings, for example. In various examples, the base releasable liner or substrate 705 can include a release agent, such as silicone. In some examples, the releasable liner or substrate 705 does not include silicone.

The decorative resin or adhesive layer 751 can operate to adhere an image received by the image transfer article 750 to a receptor element. In some examples, the decorative resin or adhesive layer 751 is coated onto the releasable liner or substrate 705. In some examples, as discussed above, the decorative resin or adhesive layer 751 includes an ethylene copolymer, such as, but not limited to, ethylene acrylic acid (EAA), ethylene methacrylic acid (EMAA), or ethylene-vinyl acetate (EVA).

In addition to resin and the associated adhering function, the decorative resin or adhesive layer 751 can also include one or more decorative materials. In some examples, the decorative resin or adhesive layer 751 includes a glitter material 790. The glitter material can include metallic or metallic-like particles with particle sizes of about 0.002 inches, for example. In some examples, the glitter material can include coated aluminum metalized polyethylene terephthalate particles. In some examples, the decorative resin or adhesive layer 751 can include luminescent materials 790 such that upon transfer of an image to a receptor element, the image, or portions thereof, glow in the dark including fluorescent and/or phosphorescent material such as, for example, alkaline earth aluminates. In some examples, the decorative resin or adhesive layer 751 can include both glitter particles and glow pigment.

The ink or other marking receptive layer 752 can be located proximate the decorative resin or adhesive layer 751, opposite the releasable liner or substrate 705. In various examples, the ink or other marking receptive layer 752 is coated onto the decorative resin or adhesive layer 751. The ink or other marking receptive layer 752 can include one or more of a polyamide copolymer, polyurethane, amide solids, ethylene acrylic acid, micronized polyethylene wax, a poly-dimethyl siloxane modified wax emulsion, or polyvinylpyrrolidone. The ink or other marking receptive layer 752 can optionally further include one or more of isopropyl alcohol, an ultrafine copolyamide, SMA (Styrene Maleic Anhydride resin), colloidal alumina, colloidal silica, polyester, a polyamide copolymer, polyurethane (optionally including surfactants such as Triton X-100, Triton 405, CT110, or Surfynol), acrylics with a glass transition temperature ($T_g$) between about −40° C. up to about 70° C., vinyl acetate, polyethylene oxide (with or without plasticizers, such as up to about 30% plasticizer), a cationic polymer, an ionic or non-ionic die-fixing agent, a polymeric ammonium compound or surfactants including an oxtylphenol ethoxylate non-ionic surfactant and an ethoxylated non-ionic fluorosurfactant, silica particles, cationic silica, clay, cationic-modified silica (e.g., JETCOAT®30) or other cationic polymer.

Upon transfer and application of a received image to a receptor element, the ink or other marking receptive layer 752 can provide a "soft touch" to the transferred image, such that it is difficult to discern by touch where the perimeter of an image transfer article begins and ends on a receptor element, such as a fabric or other textile material. The "soft touch" nature of the transferred image can provide more comfort where the receptor element is worn by a user, such as a t-shirt or infant clothing for example, and can be made possible through the use of a wax emulsion. The present inventors have found that the incorporation of a wax emulsion into one or both of the ink or other marking receptive layer 752 or the resin or adhesive layer 751 can provide better flexibility and feel to the image transfer article 750.

In some examples, the ink or other marking receptive layer 752 can include decorative materials such as glitter particles, glow pigment, or both glitter particles and glow pigment. In the illustrated image transfer article 750, an image can be applied to the ink or other marking receptive layer 752 as a mirror or reverse image of the image that is expressed after the image is transferred to a receptor element. Optionally, the glitter particles, glow pigment, or both the glitter particles and glow pigment are located in a layer distinct from the resin or adhesive layer 751 and the ink or other marking receptive layer 752.

Figure 8A:
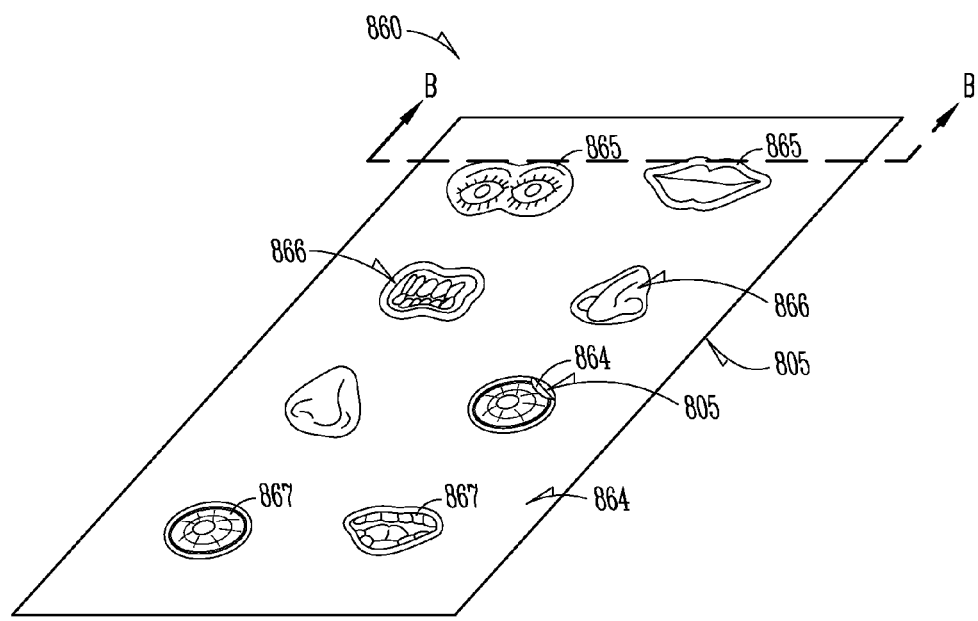
FIG. 8A illustrates an image transfer sheet, including a plurality of distinct image transfer articles separated by one or more die cuts, according to at least one embodiment.

FIG. 8A illustrates an image transfer sheet 860, according to at least one example of the present subject matter. The image transfer sheet 860 can include a releasable liner or substrate 805, one or more layers 864 on the liner or substrate 805, and one or more depth-controlled die cuts 865 at least partially defining one or more individual image transfer articles 866. The image transfer sheet 860 can include an ink or other marking receptive layer 863 positioned above the releasable liner or substrate 805. In some examples, the ink or other marking receptive layer 863 includes ink indicia forming an image 867 thereon. In some examples, one or more of the images 867 are added by a user of the image transfer sheet 860. Such images may be applied using an ink jet printer for example, but the addition of an image 867 is not so limited. Manual drawing with a pen, spray paint, brushing, stenciling or other marking instrument include other non-limiting examples of how a user may add an image to the ink or other marking receptive layer 863 of the image transfer sheet 860.

Figure 8B:
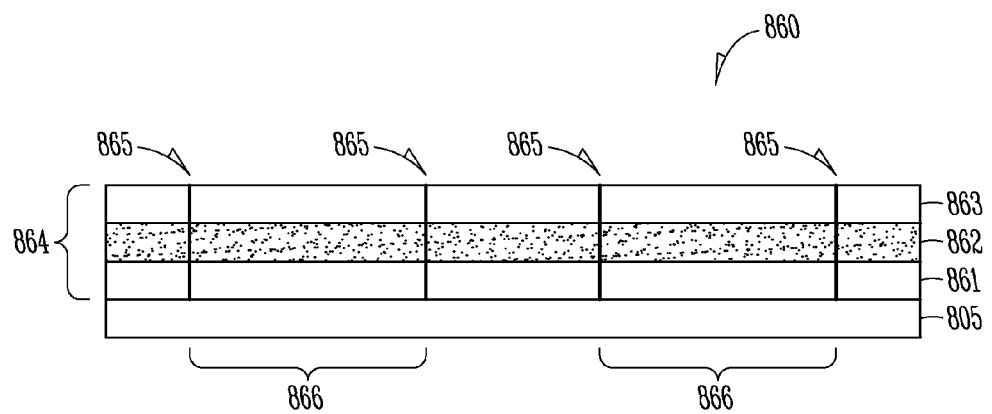
FIG. 8B illustrates a cross-sectional view of an image transfer sheet taken along a line similar to line B-B of FIG. 8A, according to at least one embodiment.

FIG. 8B illustrates a cross-sectional view of an image transfer sheet 860 taken along a line similar to line B-B of FIG. 8A, according to at least one example of the present subject matter. The image transfer sheet 860 can include a releasable liner or substrate 805 and one or more layers 864 making up one or more image transfer articles 866, each including one or more of a resin or adhesive layer 861, a decorative layer 862, and optionally an ink or other marking receptive layer 863. The cross-sectional view of the image transfer sheet 860 further illustrates a controlled-depth of one or more die cuts 865. The depth-controlled die cuts 865 can penetrate the ink or other marking receptive layer 863, the decorative layer 862, and the resin or adhesive layer 861.

Upon applying an image to the ink or other marking receptive layer 863, whether pre-printed prior to purchase or printed by a user, the die cuts 865 can allow each image transfer article 866 to be individually released from the liner or substrate 805. In various examples, an individual image transfer article 866 can be removed from the sheet 860, thus separating it from the releasable liner 805. The image transfer article 866 can then be applied to a receptor element such that the resin or adhesive layer 861 contacts a surface of the receptor element. A heat barrier, such as a tack resistant silicone overlay sheet, can be placed over an exposed image 867 received by layer 863 of the individual image transfer article 866, and heat and/or pressure can subsequently be applied to attach the image 867 to the receptor element. The applied heat and/or pressure can melt portions of the resin or adhesive layer 861 to attach the image 867 to the receptor element, the heat can also melt resin at or near the ink or other means forming the image to encapsulate and embed the ink therein. The heat barrier can then be removed, post application of heat and/or pressure, revealing the transferred image on the receptor element.

In various examples, the image transfer sheet can include one or more die cuts that defines one or more image transfer articles, each including one or more of a releasable liner or substrate, a resin or adhesive layer, or and an ink or other marking receptive layer, such as is described in association with FIG. 7. The die cuts can penetrate the ink or other marking receptive layer and the resin or adhesive layer. Application of an image to a receptor element can include applying the ink or other marking receptive layer to the receptor element, applying heat and/or pressure to the releasable liner or substrate and removing the releasable liner or substrate to reveal the image on the receptor element. In such examples, the image applied to the image transfer sheet, or the individual image transfer articles, is a reverse image of that revealed once the image is transferred (post application of heat and/or pressure) to the receptor element.

In various examples, a die-cut image transfer sheet is included in a kit of pre-printed image transfer sheets (i.e., image transfer sheets printed prior to purchase at a retailer). Pre-printed die cut image transfer sheets may or may not include an ink receptive layer. In some examples, images are applied to the image transfer sheets using ink jet printers, offset printers, flexographic printers and the associated inks (e.g., non-plastisol inks), thermal wax ribbon printers and copies, laser toner copiers, etc. In various embodiments, pre-printed image transfer sheets include one or more of the following features or components: luminescent pigments, titanium oxide and/or dioxide coated mica, tin oxide coated mica, carbon black, metallic particles such as aluminum metalized polyethylene terephthalate particles, or a vanishing resin or adhesive layer as further described below.

In use, the pre-printed image transfer articles can simply be peeled from the die cut image transfer sheet, after purchase, positioned on the receptor element, and then heated to transfer the pre-printed image via either a "regular" or "peel first" method, as discussed above. In some examples, a disposable barrier (e.g., a tack resistant silicone overlay sheet) is used between the heat source and the image transfer article when transferring the image.

In some examples, pre-printed image transfer sheets are included in a kit. In some examples, a pre-printed image transfer sheet kit includes one or more image transfer sheets bearing images related to a particular theme, such as a holiday, special occasion or a composite image where each image transfer article of an image transfer sheet is a portion of the composite image. The kit can further include instructions on a how to transfer the image to a receptor element, such as instructions and options on how to properly position image transfer articles on the receptor element for a composite image. In some examples, the kit can include one or more disposable heat barrier sheets.

Figure 9:
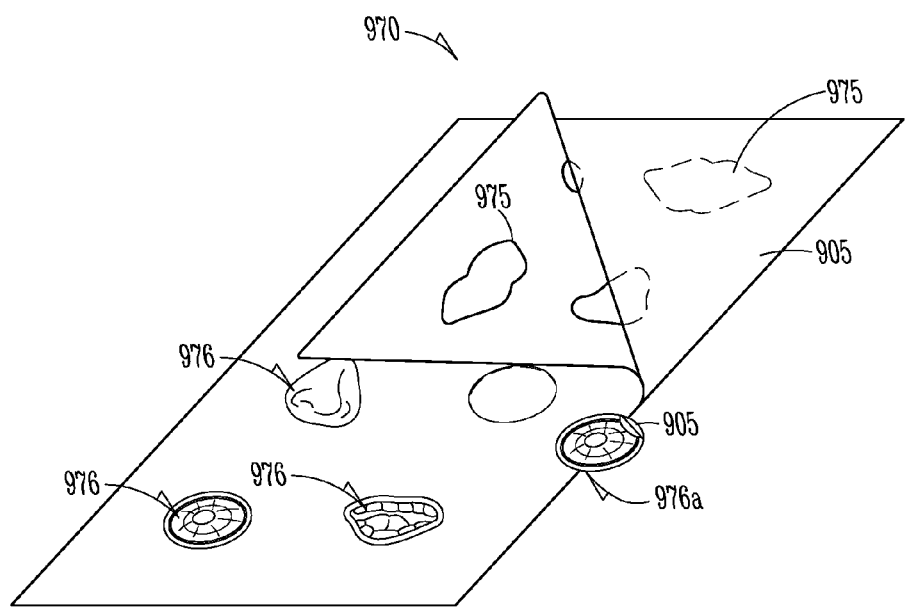
FIG. 9 illustrates an image transfer sheet, including a plurality of distinct images separated by perforations, according to at least one embodiment.

FIG. 9 illustrates an image transfer sheet 970, according to at least one example of the present subject matter. The sheet 970 includes a plurality of image transfer articles 976 at least partially defined by one or more perforation cuts 975. One or more layers of the sheet 970 are shown peeled back from a releasable liner or substrate 905 at a corner of the sheet to illustrate the perforation cuts 975, which extend through all the layers of the image transfer sheet, including the releasable liner or substrate 905. The perforated cuts 975 can allow removal of an individual image transfer article 976 from the sheet 970. As an example, the image transfer article 976a is shown removed from the sheet 970.

Options for image transfer sheets 970 including one or more image transfer articles 976 at least partially defined by perforation cuts are numerous. In some examples, removed image transfer articles 976 include the releasable liner or substrate 905, as well as, other functional or decorative layers of the image transfer sheet 970. In some examples, each image transfer article 976 includes one or more of an ink receptive layer, a decorative layer, a resin or adhesive layer, a decorative resin or adhesive layer, or a releasable liner or substrate 905, such as the combinations and options described throughout this patent document. In various some examples, the image transfer sheet 970 includes pre-printed images, images printed by the user, or pre-printed images and areas on each image transfer article allowing additional image application by the user. It is to be understood that various sized and shaped image transfer articles can be created with the depth-controlled die cuts or perforation cuts without departing from the scope of the present subject matter including, but not limited to, shapes associated with birthdays, anniversaries, holidays or religious occasions, for example. Previously, end users have been limited to using a pre-set design or a single image that they have printed to the image transfer sheet. This invention opens up an entirely new method for end users to customize their end product. The end user can now configure a unique image regardless of whether they are using a pre-printed set of images or printing their own.

Figure 10:
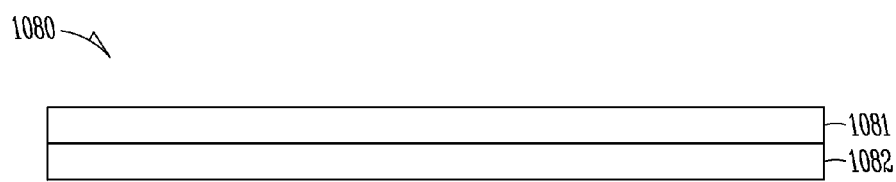
FIG. 10 illustrates a cross-sectional view of an image transfer article taken along a line similar to line A-A of FIG. 2, according to at least one embodiment.

FIG. 10 illustrates an image transfer article 1080 taken along a line similar to line A-A of FIG. 2, according to at least one example of the present subject matter. The article 1080 can include a base layer 1082 (e.g., releasable liner or substrate) and an at least partially vanishing layer 1081. In some examples, the vanishing layer 1081 includes one or more layers coated on the base layer 1082. In some examples, the vanishing layer 1081 is back-treated, such as with a corona treatment or water. The image transfer article 1080 is configured to receive an image, such as from an ink jet printer, and transfer the image to a receptor element, for example a t-shirt. The transfer process transfers the image and the vanishing layer 1081.

The vanishing layer 1081 is configured to hold or sustain the image on the receptor element until the receptor element is washed a predetermined number of times (e.g., a single washing or multiple washings). In some examples, the pores of, and binding composition amounts within, the vanishing layer 1081 are adjusted to achieve the predetermined washout number. In various examples, the vanishing layer 1081 includes a thermoplastic, water-soluble resin which provides a low bond to receptor elements, such as fabric, and is ink-jet printable. The water-soluble nature of the resin can allow received ink or other image pigment to wash out after the predetermined number of times. The thermoplastic nature of the resin allows for easy heat transfer with low bond. In use, the received image pigment acts as a collating agent that, when washed out, takes at least a portion of bond with it. In various examples, at least one binding composition in a low concentration relative to the vanishing layer 1081 weight is used to chemically bind the image pigment within the layer without precluding washability and dye drying.

Upon washing the predetermined number of times, the image disappears, thus allowing the t-shirt to be redecorated with another image, such as via the image transfer articles and methods described throughout this patent document. Such an image transfer article 1080 allows temporary decoration of receptor elements such as, but not limited to, t-shirts, hats, socks, hand bags and backpacks. In one example, temporary decoration of a receptor element may include decorating a receptor element with a holiday theme, washing the receptor element to erase the holiday theme after the holiday and then repeating the temporary decoration of the receptor element for subsequent holidays or events.

In various examples, a temporary image transfer kit can include one or more pre-printed vanishing image transfer sheets (including one or more articles at least partially defined by one or more die or perforation cuts) or articles that include a theme, such as, a Halloween theme or a birthday theme, for example. In some examples, the kit can include a receptor element upon which to transfer the pre-printed images of the vanishing image transfer articles or sheets. In some examples, each vanishing image transfer article or sheet can include a base layer coated with a vanishing layer solution including water, isopropyl alcohol, fine particle marble, poly(ethylene oxide) having a molecular weight between about 100,000 to about 8 million, a large particle polyethylene wax and a hot melt. In some examples, the base layer is coated twice to form the vanishing layer.

Experimental Examples

In order that the present image transfer articles, sheets and methods can be more fully understood, the following examples are given by way of illustration but not limitation.

Experimental Example 1

Articles or Sheets Including Pearlescent Effects

|  |  | Coat Weight (grams per square meter (gsm) dry) | Coating Solids | Approx. Rod Size |
|---|---|---|---|---|
| Resin or Adhesive Layer | Formula A | In some examples, between about 2.5 to 75; in some examples, between about 6 to 60; and in some examples, between about 12 to 35 | 40.00% | 26 |
| Decorative Layer | Formula E | In some examples, between about 19 to 82; in some examples, between about 24 to 59; and in some examples, between about 26 to 30 | 51.94% | 32 |
| Ink or Other Marking Receptive Layer | Formula C | In some examples, between about 2 to 80; in some examples, between about 4 to 45; and in some examples, between about 6 to 30 | 26.50% | 30 |

Coated on releasable liner or substrate

Experimental Example 2

Articles or Sheets Including Metallic Effects

|  |  | Coat Weight (grams per square meter (gsm) dry) | Coating Solids | Approx. Rod Size |
|---|---|---|---|---|
| Resin or Adhesive Layer | Formula A | In some examples, between about 2.5 to 75; in some examples, between about 6 to 60; and in some examples, between about 12 to 35 | 40.00% | 26 |
| Decorative Layer | Formula D | In some examples, between about 19 to 82; in some examples, between about 24 to 59; and in some examples, between about 26 to 30 | 51.85% | 32 |
| Ink or Other Marking Receptive Layer | Formula C | In some examples, between about 2 to 80; in some examples, between about 4 to 45; and in some examples, between about 6 to 30 | 26.50% | 30 |

Coated on releasable liner or substrate

Experimental Example 3

Articles or Sheets Including Sparkle Effects

|  |  | Coat Weight (grams per square meter (gsm) dry) | Coating Solids | Approx. Rod Size |
|---|---|---|---|---|
| Resin or Adhesive Layer | Formula A | In some examples, between about 2.5 to 75; in some examples, between about 6 to 60; and in some examples, between about 12 to 35 | 40.00% | 26 |
| Decorative Layer | Formula B | In some examples, between about 19 to 82; in some examples, between about 24 to 59; and in some examples, between about 40 to 46 | 51.97% | 34 |

-continued

|  |  | Coat Weight (grams per square meter (gsm) dry) | Coating Solids | Approx. Rod Size |
|---|---|---|---|---|
| Ink or Other Marking Receptive Layer | Formula C | In some examples, between about 2 to 80; in some examples, between about 4 to 45; and in some examples, between about 6 to 30 | 26.50% | 30 |

Coated on releasable liner or substrate

Experimental Example 4

Articles or Sheets Including Glitter Effects

|  |  | Coat Weight (grams per square meter (gsm) dry) | Coating Solids | Approx. Rod Size |
|---|---|---|---|---|
| Decorative Resin or Adhesive Layer | Formula F | In some examples, between about 5 to 130; in some examples, between about 10 to 90; and in some examples, between about 20 to 65 | 36.06% | 55 |
| Ink or Other Marking Receptive Layer | Formula G | In some examples, between about 4 to 100; in some examples, between about 8 to 75; and in some examples, between about 15 to 45 | 33.00% | 34 |

Coated on releasable liner or substrate

Experimental Example 5

Articles or Sheets Including Glow Effects

|  |  | Coat Weight (grams per square meter (gsm) dry) | Coating Solids | Approx. Rod Size |
|---|---|---|---|---|
| Decorative Resin or Adhesive Layer | Formula I | In some examples, between about 3 to 108; in some examples, between about 10 to 80; and in some examples, between about 15 to 45 | 39.54% | 36 |
| Ink or Other Marking Receptive Layer | Formula G | In some examples, between about 4 to 100; in some examples, between about 8 to 75; and in some examples, between about 15 to 45 | 33.00% | 34 |

Coated on releasable liner or substrate Optionally, EAA/EVA/PE can be coated from about 6 gsm to about 70 gsm, plus 20% glow pigment.

Experimental Example 6

Articles or Sheets Including Vanish Effects

|  |  | Coat Weight (grams per square meter (gsm) dry) | Coating Solids | Approx. Rod Size |
|---|---|---|---|---|
| Vanishing Layer | Formula H | In some examples, between about 3 to 110; in some examples, between about 5 to 85; and in some examples, between about 10 to 50 | 22.90% | 42 |
| Optional Second Vanishing Layer | Formula H | In some examples, between about 3 to 110; in some examples, between about 5 to 85; and in some examples, between about 10 to 50 | 22.90% | 26 |

Coated on releasable liner or substrate

Experimental Formulas

| Raw Material | Weight Percentage |
|---|---|
| Formula A | |
| Ethylene Vinyl Acetate (EVA) Dispersion or EVA Melt Extruded or Blend EVA/EAA or EVA/Surlin Solids: 38% to 42% | 100.00000% |

| Raw Material | Weight Percentage |
|---|---|
| Formula B | |
| Polyurethane Dispersion | 50% to 90% |
| Glitter | 10% to 35% |
| Surfactant | 0% to 2% |
| Solids: 50% to 54% | |

-continued

| Raw Material | Weight Percentage |
|---|---|
| Formula C | |
| R.O. Water | 48% to 52% |
| Silica | 2% to 22% |
| Non-Ionic Surfactant | 0% to 2% |
| Polyamide Polymer | 3% to 30% |
| Polyurethane Dispersion | 9% to 40% |
| Dye Fix | 0% to 15% |
| Surfactant | 0% to 2% |
| Solids: 24.5% to 28.5% | |
| Formula D | |
| Polyurethane Dispersion | 50% to 90% |
| Metallic Effect Pigment | 18% to 22% |
| Carbon Black Dispersion | 0% to 2% |
| Surfactant | 0% to 2% |
| Solids: 50% to 54% | |
| Formula E | |
| Polyurethane Dispersion | 50% to 90% |
| Metallic Effect Pigment | 18% to 22% |
| Surfactant | 0% to 2% |
| Solids: 50% to 54% | |
| Formula F | |
| Ethylene Vinyl Acetate (EVA) Dispersion or EVA Melt Extruded or Blend EVA/EAA or EVA/Surlin | 94% to 98% |
| Glitter | 2% to 6% |
| Solids: 34% to 38% | |
| Formula G | |
| Water | 35% to 39% |
| Isopropyl Alcohol | 1% to 5% |
| Polyamide Polymer | 3% to 30% |
| Wax | 1% to 15% |
| Amine | 0% to 2% |
| Ethylene Vinyl Acetate Polymer | 13% to 17% |
| Wax | 5% to 45% |
| Wax | 0% to 17% |
| Water Soluble Polymer | 0% to 25% |
| Surfactant | 0% to 2% |
| Cationic Polymer | 0% to 30% |
| Silicone Wax | 0% to 20% |
| Silica | 2% to 22% |
| Solids: 31% to 35% | |
| Formula H | |
| R.O. Water | 68% to 72% |
| Water Soluble Polymer | 0.2% to 20% |
| Inorganic Pigment | 0% to 25% |
| Silica | 1% to 23% |
| Polyamide Polymer | 2% to 40% |
| Wax Dispersion | 0.5% to 22% |
| Formula I | |
| Acrylic Acid Copolymer Dispersion | 50% to 97% |
| Glow-In-The-Dark Pigment | 3% to 25% |
| Solids: 38% to 40% | |

Closing Notes:

The present image transfer articles, sheets and methods provide decorative effects, that have not been a part of the standard image transfer process, incorporating metallic flakes, metallic-like flakes, glitter, sparkle, luminescent materials (e.g., having a glow-in-the-dark effect), pearlescent materials, reflective materials, or combinations thereof. Further, the invention allows for a new degree of creativity for the end user by providing the ability to uniquely create their own images by placing the pre-printed or personally made images into their own design. Accordingly, image transfers that meet high quality standards with respect to decorative materials, brightness, color options, uniqueness, clarity without bleeding or mottling, opacity, dry strength and wet strength are now possible.

The above Detailed Description includes references to the accompanying drawings, which form a part of the Detailed Description. The drawings show, by way of illustration, specific embodiments in which the invention can be practiced. These embodiments are also referred to herein as "examples." The present subject matter may be embodied in specific forms other than those described above or illustrated by the appended drawings. Upon reviewing the present patent document, embodiments and other descriptions of the present subject matter, variations and other implementations that do not depart from the spirit and scope of the present subject matter will be apparent to one of routine skill in the this field. Such variations and other implementations are considered part of the present invention and within the scope of the appended claims.

Referred to herein may be trade names for materials including, but not limited to, polymers and optional components. The present subject matter is not intended to be limited by the materials described and referenced by a particular trade name. Equivalent materials may be substituted and utilized in the apparatus and methods described herein without departing from the scope of the present subject matter.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, references to "an," "one," or "various" embodiments are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

In the appended claims, the terms "including" and "in which" are used as the plain-English equivalents of the respective terms "comprising" and "wherein." Also, in the following claims, the terms "including" and "comprising" are open-ended, that is, a system, assembly, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. An image transfer sheet, comprising:
a releasable liner or substrate; and
one or more imaged heat transfer articles disposed on the releasable liner or substrate, each of the one or more imaged heat transfer articles transferable to a receptor element by application of heat to that imaged heat transfer article, and each of the one or more imaged heat transfer articles comprising:
a marking receptive layer comprising a polyamide copolymer, ethylene acrylic acid, a wax emulsion, silica, and a polymethyl siloxane modified wax emulsion, the marking receptive layer configured to receive an image pre-formed thereon, the image having a perimeter;

a resin or adhesive layer disposed between the releasable liner or substrate and the marking receptive layer; and at least one die cut extending through the marking receptive layer and the resin or adhesive layer and substantially conforming to the perimeter of the image, the at least one die cut being depth-controlled so as not to cut the releasable liner or substrate, and allowing the imaged heat transfer article to separate from the releasable liner or substrate within a boundary defined by the at least one die cut.

2. The image transfer sheet of claim 1, wherein the resin or adhesive layer comprises a luminescent pigment.

3. The image transfer sheet of claim 1, wherein the resin or adhesive layer comprises a plurality of metalized polyester or polyethylene particles.

4. The image transfer sheet of claim 1, further comprising a decorative layer disposed between the marking receptive layer and the resin or adhesive layer, wherein the at least one die cut extends through the decorative layer.

5. The image transfer sheet of claim 4, wherein the decorative layer comprises at least one of mica, carbon black or a plurality of metalized polyester or polyethylene particles.

6. The image transfer sheet of claim 5, wherein the mica is coated with at least one of titanium dioxide or tin oxide.

7. The image transfer sheet of claim 1, wherein the marking receptive layer includes at least one of a luminescent pigment or a plurality of metalized polyester or polyethylene particles.

8. The image transfer sheet of claim 1, wherein the resin or adhesive layer includes a plurality of coated aluminum metalized polyethylene terephthalate particles.

9. The image transfer sheet of claim 1, wherein the image is a printed image.

10. The image transfer sheet of claim 1, wherein the at least one die cut comprises a plurality of die cuts defining a shape associated with a birthday, an anniversary, a holiday, or a religious occasion.

11. An image transfer sheet, comprising:
a releasable liner or substrate;
a resin or adhesive layer disposed on the releasable liner or substrate;
a marking receptive layer disposed above the resin or adhesive layer; and
one or more imaged heat transfer articles, each of the one or more imaged heat transfer articles transferable to a receptor element by application of heat to that imaged heat transfer article;

wherein the one or more imaged heat transfer articles each have an image pre-formed thereon, the image having a periphery;

wherein the one or more imaged heat transfer articles also each have a perforated perimeter defined by a set of perforations extending through the releasable liner or substrate, the resin or adhesive layer, and the marking receptive layer, the perforated perimeter substantially conforming to the periphery of the image; and wherein the one or more imaged heat transfer articles are each separable from remaining portions of the image transfer sheet via the set of perforations.

12. The image transfer sheet of claim 11, wherein the image is disposed on the marking receptive layer.

13. The image transfer sheet of claim 11, wherein the one or more imaged heat transfer articles include at least a first imaged heat transfer article defined by a first set of perforations and a second imaged heat transfer article defined by a second set of perforations.

14. The image transfer sheet of claim 13, wherein the first set of perforations define a first shape and the second set of perforations define a second shape, different than the first shape.

15. The image transfer sheet of claim 11, wherein the resin or adhesive layer includes at least one of a plurality of coated aluminum metalized polyethylene terephthalate particles, carbon black, or a luminescent material.

16. The image transfer sheet of claim 11, wherein the resin or adhesive layer includes a polyamide copolymer, ethylene acrylic acid, and a wax emulsion.

17. The image transfer sheet of claim 11, wherein the image comprises an image associated with a birthday, an anniversary, a holiday or a religious occasion.

18. The image transfer sheet of claim 11, wherein the one or more imaged heat transfer articles include at least a first imaged heat transfer article defined by a first set of perforations and a second imaged heat transfer article defined by a second set of perforations, the first and second set of perforations defining shapes associated with a birthday, an anniversary, a holiday or a religious occasion.

19. The image transfer sheet of claim 11, wherein the perforated perimeter defines a shape associated with a birthday, an anniversary, a holiday or a religious occasion.

* * * * *